(No Model.) 2 Sheets—Sheet 1.
W. S. CLARK.
APPARATUS FOR TESTING AND DISINFECTING DRAIN OR SOIL PIPES.
No. 409,013. Patented Aug. 13, 1889.
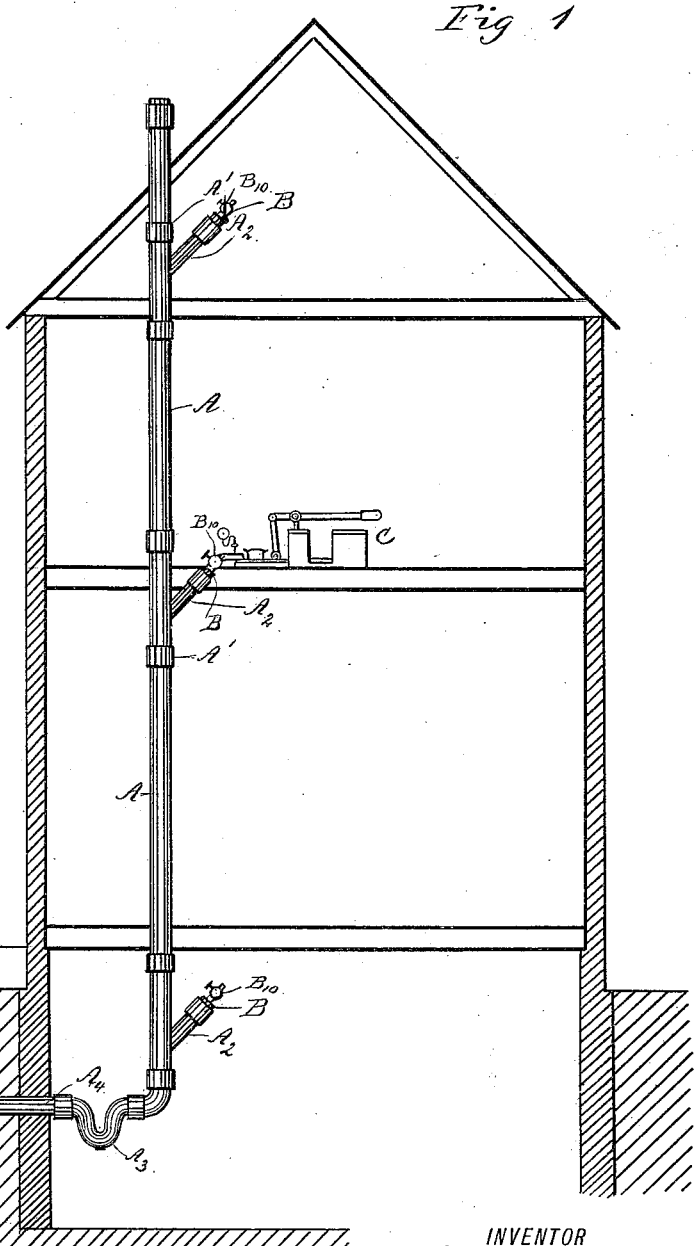

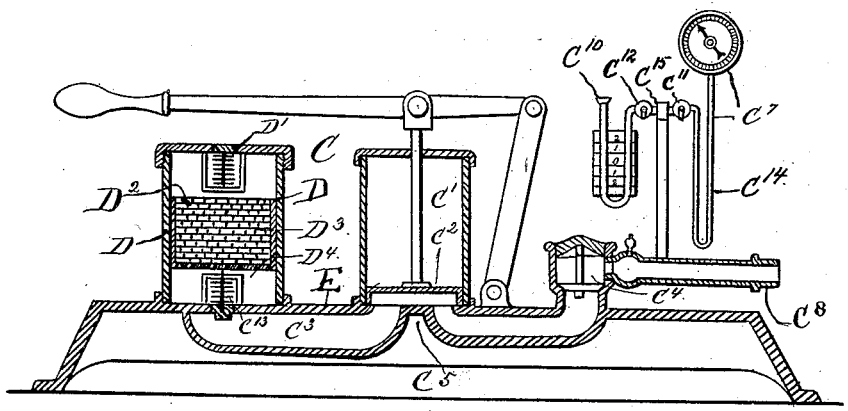
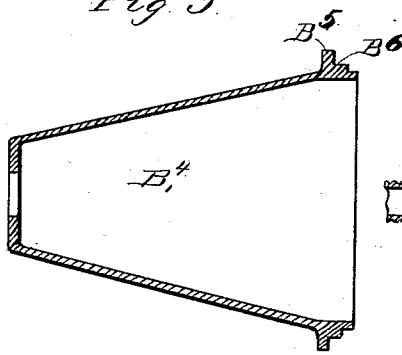
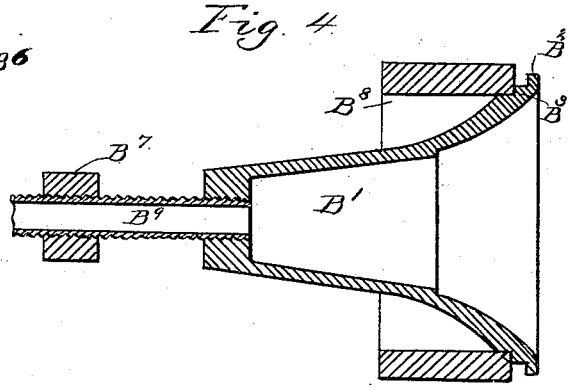
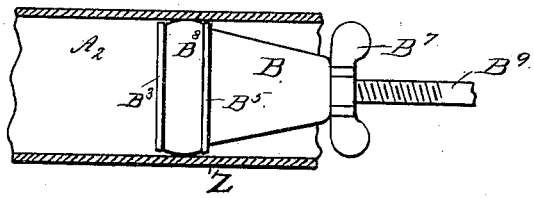

UNITED STATES PATENT OFFICE.

WILLIAM S. CLARK, OF PHILADELPHIA, PENNSYLVANIA.

APPARATUS FOR TESTING AND DISINFECTING DRAIN OR SOIL PIPES.

SPECIFICATION forming part of Letters Patent No. 409,013, dated August 13, 1889.

Application filed May 9, 1889. Serial No. 310,182. (No model.)

*To all whom it may concern:*

Be it known that I, WILLIAM S. CLARK, a citizen of the United States, residing at Philadelphia, in the county of Philadelphia and State of Pennsylvania, have invented certain new and useful Improvements in Apparatus for Testing and Disinfecting Drain or Soil Pipes; and I do hereby declare the following to be a sufficiently full, clear, and exact description thereof as to enable others skilled in the art to make and use the said invention.

This invention relates to the disinfecting and testing of drain or soil pipes, and has for its object the disinfection and deodorizing of such pipes and the detection and locating of leaks.

To effect these results, this invention consists in an apparatus for, first, partially closing the inlets and branches of such pipes, and then forcing into and through them of disinfecting vapors or fumes and afterward closing the outlets and subjecting the pipes to pneumatic pressure with air containing volatile substances which by their odor indicate the location of any leak.

I will now proceed to fully and particularly describe my invention, referring in so doing to the annexed drawings, in which—

Figure 1 shows a building in vertical section, having soil and drain pipes to which this apparatus is applied. Fig. 2 shows a section of a pipe end with a plug applied. Figs. 3 and 4 show the parts of the plug in section separately. Fig. 5 shows a section of the air forcing and fumigating apparatus; and Figs. 6 and 7 show modifications of the fumigating or disinfecting apparatus in vertical section.

The same letters of reference and ordinals indicate the same parts in the several figures.

A represents a soil-pipe united by bell and spigot joints A', leaded and calked in the usual manner, and having branches $A^2$ for receiving drainage, and the usual trap $A^3$ and outlet $A^4$ to the common sewer or culvert.

B are stoppers inserted in the inlets $A^2$ and outlets $A^4$. The stopper B consists of a circular hollow conical metallic plug B', provided with a flange $B^2$, formed with a step or shoulder $B^3$ upon it, and a conical cap $B^4$, fitting over the plug B', also provided with a flange or rim $B^5$, having a shoulder $B^6$ formed upon it. Centrally into the plug B is securely fixed a screw-threaded tube $B^9$, which passes through the cap $B^4$ and is provided with a wing-nut $B^7$. A band of india-rubber $B^8$ is fitted around the plug B, between the flanges $B^2$ and $B^5$. When the cap $B^4$ is raised from the plug B', the rubber band $B^8$ rests upon the step $B^3$ in the flange $B^2$ and the shoulder $B^6$ in the cap $B^4$. As the cap $B^4$ is forced, by screwing the wing-nut $B^7$ on the tube $B^9$, toward the plug B', the band $B^8$, under the compression, expands in the center of its length, and the ends of the band $B^8$, turning upon the angle of the shoulders $B^3$ and $B^6$, rest around the shoulders $B^3$ and $B^6$, and with what was before expansion the edges of the cylindric face of the band $B^8$, now as flat surfaces, rest against the flanges $B^2$ and $B^5$, thus producing a greater extent of expansion than was practicable with the flanges $B^2$ and $B^5$ without the shoulders $B^3$ and $B^6$. The exterior form of the plug B' and the interior form of the cap $B^4$ are such that they fit within each other and touch at the upper ends, thus restricting excessive motion and injury to the flanges $B^2$ and $B^5$ by forcing them unduly close to each other. This construction of plug adapts it to fit a larger range of diameters of pipes than when the india-rubber is simply compressed between flat flanges and thereby diametrically expanded, and is more flexible and readily adapts itself to any imperfections of the interior surfaces of pipes. A stop-cock $B^{10}$ or valve serves to open and close communication with the pipe through the tube $B^9$.

C is an air-pump, consisting of a cylinder C', detachably connected to a base bed-plate E, a piston $C^2$, inlet-passage $C^3$, and outlet-valve $C^4$, terminating in a two-branched tube $C^5$, one of which branches is connected, through an inverted-siphon seal $C^{14}$, with a manometer or pressure-gage $C^7$ and a siphon-gage $C^{10}$, which are to be used alternately for low and high pressures, and the other branch with a tube $C^8$, leading to one of the stop-cocks $B^{10}$ on one of the plugs B, inserted in a branch $A^2$ of the soil-pipe A to be fumigated and tested. Stop-cocks $C^{11}$ and $C^{12}$ are placed in the manometer and siphon-gage connections.

Connected with the inlet-passage $C^{13}$ is a fumigating chamber or vessel D, having an air-inlet valve D', opening downward and supported by light springs at the upper portion, a perforated vessel $D^2$, filled with an absorbent material $D^3$—such as a sponge—and a perforated tube $D^4$, leading to the passage $C^3$ and containing the inlet-valve $C^{13}$ of the pump C, which is constructed like the valve $D^2$ and is removably inserted in the base of the fumigating-chamber D in the bed-plate E. The perforated vessel $D^2$ is removable and can be replaced by a vessel for burning sulphur, as shown in Fig. 6, or by a vessel for holding volatile fluids, as shown in Fig. 7, instead of the saturated sponge $D^3$.

The operation of disinfecting and testing with this apparatus is as follows: The plugs B are inserted in the branches $A^2$ and outlets $A^4$, and the nuts $B^7$ tightened, so as to expand the packing $B^8$. The disinfecting-fluid is introduced in the vessel D and air drawn through it and forced through the tube $C^8$ and out of the stop-cocks B' until the escaping air passing from the other stop-cocks B' indicates by its odor, and the siphon-gage $C^{10}$, indicating the resistance to the air made by the trap-seals of the pipes, shows that the disinfecting agent has reached that part. All of the stop-cocks $B^{10}$, except that connected with the tube $C^8$, are then closed and the pump is operated until the desired pressure is indicated by the manometer $C^7$. The stop-cock $C^{12}$ is then closed, and if the manometer shows a continuance of the full pressure the pipes A are known to be tight. If, however, the pressure is shown to subside on the manometer, an examination of the pipe A will show by the odor of the escaping disinfectant or fumigating-vapors the location of the leak, which, being repaired, the test is repeated. Until the pressure remains constant on the manometer, by drawing the air through the fumigating-vessel, disinfectants—such as sulphur—can be used, which cannot be done when the fumigating-chamber is under pressure with the pipes under test.

Having described my invention, what I claim is—

1. A fumigating-vessel having a spring-supported air-inlet valve opening downward in the top, a removable perforated support for combustible fumigating material, and an outlet-tube at the base connected and combined with the inlet-valve of an air-forcing pump, constructed and arranged to operate substantially as set forth.

2. The combination of the air-pump C with the bed-plate E, and the fumigating-vessel D containing the removably-attached pump, inlet-valve $C^{13}$, and air-inlet valve D', said fumigating-vessel being detachably connected to the bed-plate E, substantially as shown and described.

3. The combination of the air-pump C, supported by the bed-plate E, which is provided with the valve $C^4$, with the vessel D, provided with the pump-inlet spring-valve $C^{13}$, the manometer $C^7$, siphon-seal $C^{14}$, and siphon-gage $C^{10}$, provided with the cocks $C^{11}$ and $C^{12}$, substantially as shown and described, and for the purpose set forth.

WILLIAM S. CLARK.

Witnesses:
J. DANIEL EBY,
A. V. BUDD.